United States Patent
Wang et al.

(10) Patent No.: US 11,925,898 B2
(45) Date of Patent: Mar. 12, 2024

(54) FLUE GAS LOW-TEMPERATURE ADSORPTION DENITRIFICATION METHOD

(71) Applicant: HUANENG CLEAN ENERGY RESEARCH INSTITUTE, Beijing (CN)

(72) Inventors: Shiqing Wang, Beijing (CN); Qixiang Fan, Beijing (CN); Shisen Xu, Beijing (CN); Shiwang Gao, Beijing (CN); Shaomin Wang, Beijing (CN); He Zhao, Beijing (CN); Minhua Jiang, Beijing (CN); Ping Xiao, Beijing (CN); Bin Huang, Beijing (CN); Hongwei Niu, Beijing (CN); Jinyi Wang, Beijing (CN); Lianbo Liu, Beijing (CN)

(73) Assignee: HUANENG CLEAN ENERGY RESEARCH INSTITUTE, Beijing (CN)

( * ) Notice: Subject to any disclaimer, the term of this patent is extended or adjusted under 35 U.S.C. 154(b) by 460 days.

(21) Appl. No.: 17/222,994

(22) Filed: Apr. 5, 2021

(65) Prior Publication Data
US 2021/0220772 A1    Jul. 22, 2021

Related U.S. Application Data

(63) Continuation of application No. PCT/CN2020/076851, filed on Feb. 26, 2020.

(30) Foreign Application Priority Data

Oct. 29, 2019    (CN) .......................... 201911039138.1

(51) Int. Cl.
*B01D 53/56* (2006.01)
*B01D 53/04* (2006.01)
*B01D 53/26* (2006.01)

(52) U.S. Cl.
CPC .............. *B01D 53/56* (2013.01); *B01D 53/04* (2013.01); *B01D 53/265* (2013.01);
(Continued)

(58) Field of Classification Search
CPC ...... B01D 53/56; B01D 53/04; B01D 53/265; B01D 2253/102; B01D 2257/404;
(Continued)

(56) References Cited

U.S. PATENT DOCUMENTS 4,950,473 A * 8/1990 Flockenhaus .......... B01D 53/56
                                                422/62
5,362,463 A * 11/1994 Stiles ................. B01D 53/8631
                                                423/239.1
(Continued)

FOREIGN PATENT DOCUMENTS

CN    103301723 A  *  9/2013
CN    104785102 A     7/2015
(Continued)

OTHER PUBLICATIONS

Epo translation of CN106861378 (Year: 2017).*
(Continued)

*Primary Examiner* — Stephen Hobson
(74) *Attorney, Agent, or Firm* — W&G Law Group

(57) ABSTRACT

The present invention discloses a flue gas low-temperature adsorption denitrification method, including: pressurizing a flue gas that has been subjected to dust removal and desulfurization, precooling the pressurized flue gas, cooling the precooled flue gas to a temperature lower than room temperature by a flue gas cooling system, flowing the flue gas at the temperature lower than room temperature into a low-temperature denitrification system, performing physical adsorption denitrification in the low-temperature denitrification system, precooling the flue gas that has been sub-
(Continued)

jected to dust removal and desulfurization with the denitrificated flue gas, and flowing the heat-absorbed clean flue gas into a chimney to be discharged.

9 Claims, 2 Drawing Sheets

(52) U.S. Cl.
CPC .. *B01D 2253/102* (2013.01); *B01D 2257/404* (2013.01); *B01D 2257/80* (2013.01); *B01D 2258/0283* (2013.01)

(58) Field of Classification Search
CPC ........ B01D 2257/80; B01D 2258/0283; B01D 53/565; B01D 2253/108; B01D 51/10; B01D 53/0438; B01D 53/002; Y02A 50/20; Y02C 20/10
See application file for complete search history.

(56) References Cited

U.S. PATENT DOCUMENTS

| | | | | |
|---|---|---|---|---|
| 6,103,205 A * | 8/2000 | Wojtowicz | ............. | B01D 53/04 |
| | | | | 95/134 |
| 6,162,409 A * | 12/2000 | Skelley | .................. | B01D 53/60 |
| | | | | 423/393 |
| 8,475,752 B2 * | 7/2013 | Wan | ..................... | B01J 37/0246 |
| | | | | 502/340 |
| 9,149,765 B2 * | 10/2015 | Naito | ..................... | B01D 53/60 |
| 9,669,353 B2 * | 6/2017 | Naito | ..................... | F04B 39/16 |
| 9,945,609 B2 * | 4/2018 | Naito | ..................... | C01B 32/50 |
| 2003/0124041 A1 * | 7/2003 | Neumann | ............ | B01D 53/565 |
| | | | | 423/235 |
| 2008/0156035 A1 * | 7/2008 | Aspelund | ............... | F25J 1/0042 |
| | | | | 62/902 |
| 2012/0014861 A1 * | 1/2012 | Hirata | ................ | B01D 53/1475 |
| | | | | 423/437.1 |
| 2013/0319040 A1 * | 12/2013 | Naito | ..................... | F23L 7/007 |
| | | | | 62/617 |
| 2015/0044116 A1 * | 2/2015 | Suchak | .................. | B01D 53/64 |
| | | | | 423/210 |
| 2015/0190751 A1 * | 7/2015 | Naito | ..................... | B01D 53/79 |
| | | | | 422/105 |
| 2015/0190752 A1 * | 7/2015 | Naito | ..................... | B01D 53/75 |
| | | | | 422/105 |
| 2016/0018159 A1 * | 1/2016 | Naito | ..................... | F04B 39/16 |
| | | | | 110/215 |
| 2018/0154306 A1 * | 6/2018 | Giraldo | .................. | B01D 53/79 |
| 2018/0236395 A1 * | 8/2018 | Naito | ..................... | B01J 20/165 |

FOREIGN PATENT DOCUMENTS

| | | | | | |
|---|---|---|---|---|---|
| CN | 105498821 | A | * | 4/2016 | ............. B01D 53/56 |
| CN | 105688616 | A | | 6/2016 | |
| CN | 105854541 | A | * | 8/2016 | ............. B01D 53/04 |
| CN | 106039940 | A | * | 10/2016 | |
| CN | 106582224 | A | * | 4/2017 | ........... B01D 46/023 |
| CN | 106731538 | A | * | 5/2017 | |
| CN | 106861378 | | * | 6/2017 | |
| CN | 106861378 | A | * | 6/2017 | |
| CN | 107008143 | A | * | 8/2017 | ........... B01D 53/005 |
| CN | 108114583 | A | * | 6/2018 | ........... B01D 5/0006 |
| CN | 108211698 | A | * | 6/2018 | |
| CN | 108310958 | A | | 7/2018 | |
| CN | 108310968 | A | | 7/2018 | |
| CN | 108371878 | A | * | 8/2018 | ............. B01D 53/56 |
| CN | 108479332 | A | * | 9/2018 | ........... B01D 53/265 |
| CN | 108554145 | A | * | 9/2018 | ............. B01D 50/00 |
| CN | 108654221 | A | * | 10/2018 | |
| CN | 108970352 | A | | 12/2018 | |
| CN | 109550371 | A | * | 4/2019 | ............. B01D 47/06 |
| CN | 109966917 | A | | 7/2019 | |
| CN | 110131742 | A | * | 8/2019 | |
| CN | 110152478 | A | | 8/2019 | |
| CN | 110743313 | A | * | 2/2020 | ............... B01D 5/00 |
| CN | 110743313 | A | | 2/2020 | |
| DE | 3604946 | A | * | 7/1986 | ......... B01D 53/8625 |
| DE | 3804228 | A | * | 8/1989 | ......... B01D 53/8631 |
| EP | 1140327 | A4 | * | 10/2001 | ............. B01D 53/56 |
| GB | 2416389 | A | * | 1/2006 | ............. F25J 1/0027 |
| JP | 2002355552 | A | | 12/2002 | |
| JP | 2012143699 | A | * | 8/2012 | |
| JP | 5598421 | B2 | | 10/2014 | |
| WO | WO-2010036748 | A1 | * | 4/2010 | ........... B01D 53/002 |
| WO | WO-2014057652 | A1 | * | 4/2014 | ........... B01D 53/002 |

OTHER PUBLICATIONS

"First Office Action" (201911039138.1) [dated May 20, 2020].
International Search Report (PCT/CN2020/076851); dated Jul. 29, 2020.

* cited by examiner

FLUE GAS LOW-TEMPERATURE ADSORPTION DENITRIFICATION METHOD

TECHNICAL FIELD

The present invention relates to the technical field of flue gas denitrification, and particularly relates to a flue gas low-temperature adsorption denitrification method.

BACKGROUND

The flue gas produced by coal combustion contains a large amount of nitrogen oxides NOx, which is one of the main causes of air pollution. At present, NOx in the flue gas is mainly removed by a SCR selective catalytic reduction method, in which NOx is reduced to harmless $N_2$ by $NH_3$ added to the flue gas under the action of a catalyst, and then removed. Although the SCR denitrification technology is quite mature at present, there are still many problems. For example, the catalyst has a high activity only in a specific temperature range, and when the operating load of the power plant is adjusted, the change of the temperature of the flue gas will seriously affect the SCR denitrification efficiency. In addition, SCR denitrification has secondary pollution problems such as ammonia escape, solid waste of catalyst, etc., and the aging and loss of the denitrification catalyst are also very fast, resulting in high operating costs. In addition to the SCR selective reduction method, the wet denitrification technology is also used, but it is necessary for both of them to oxidize the insoluble NO gas in NOx into soluble $NO_2$ acidic gas first, and then removed by absorption with an alkaline liquid. Common pre-oxidation methods include an ozone method, a hydrogen peroxide method, a catalyst oxidation method, a low-temperature plasma oxidation method and so on. The ozone method and the hydrogen peroxide method need to consume extra strong oxidants, which is high in operation costs and is prone to cause secondary pollution discharge; the catalyst oxidation method needs to use expensive precious metal catalysts, and it is difficult to be industrialized; and the low-temperature plasma oxidation has high power consumption, which also leads to high operation costs.

SUMMARY

In order to solve the problems existing in the prior art, the present invention discloses a flue gas low-temperature adsorption denitrification method, which realizes direct low-temperature adsorption removal of NOx, does not need pre-oxidation or catalysts in the flue gas, and reduces flue gas denitrification costs.

In order to achieve the above purpose, the technical solution adopted by the present invention is as follows: a flue gas low-temperature absoprtion denitrification method by includes: pressurizing a flue gas that has been subjected to dust removal and desulfurization, precooling the pressurized flue gas, cooling the precooled flue gas to a temperature lower than room temperature by a flue gas cooling system, flowing the flue gas at the temperature lower than room temperature into a low-temperature denitrification system, performing physical adsorption denitrification in the low-temperature denitrification system, precooling the flue gas that has been subjected to dust removal and desulfurization with the denitrificated flue gas, and flowing the heat-absorbed clean flue gas into a chimney to be discharged.

The precooled flue gas is indirectly cooled with a heat exchanger, or cooled by direct spray cooling, or cooled by a combination of indirect cooling with a heat exchanger and direct spray cooling.

The precooled flue gas is subjected to staged cooling, and the flue gas is subjected to a first stage cooling by heat exchange or spraying.

The flue gas is subjected to a second stage cooling by absorption refrigeration or compression refrigeration.

Condensate water generated after flue gas cooling is recycled to a reclaimed water treatment system.

A denitrification adsorption tower is filled with activated carbon or molecular sieves to adsorb NOx.

Adsorbed $NO_2$ is desorbed and recycled.

The denitrification adsorption tower is thermally insulated at the same time when physical adsorption denitrification is performed in the denitrification adsorption tower.

The temperature of the flue gas obtained after the flue gas is cooled is $-30°$ C.$-0°$ C.

Compared with the prior art, the present invention has at least the following beneficial effects: in the present invention, physical adsorption denitrification is adopted, $NO_2$ and NO are directly adsorbed and removed at the same time, so that NOx is directly adsorbed and removed, the use of catalyst and reducing agent $NH_3$ in the traditional SCR denitrification process is eliminated, and secondary pollution discharge caused by ammonia escape is also eliminated, without the need of pre-oxidation of NO; the removal rate of NOx is high, which can realize 100% removal and zero discharge of NOx; a large amount of acidic condensate water is precipitated in the process of flue gas cooling, and the recovered condensate water can be used by power plants after neutralization treatment, thus reducing the water consumption of power plants; the process adopts a physical method to carry out denitrification, without using any denitrification catalyst, reducing agents or oxidant or other chemicals, thus reducing the operation costs, reducing the secondary pollution discharges such as ammonia escape and realizing the recycling of water resources.

Furthermore, the denitrification adsorption tower is thermally insualted to prevent heat exchange between the outside and the denitrification adsorption tower, so that the physical adsorption denitrification process is kept below room temperature and the denitrification efficiency is thus improved.

Furthermore, the adsorbed NOx is desorbed in the form of $NO_2$, which is collected and used to prepare high value-added by-products such as nitric acids or nitrogen fertilizers.

Figure 1:
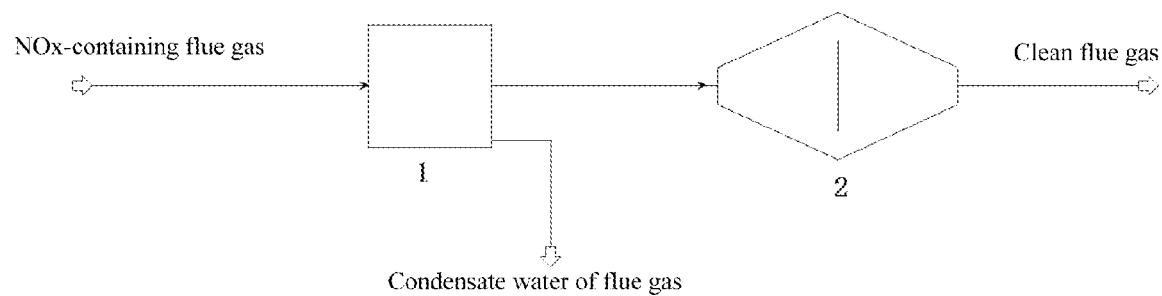
FIG. 1 is a schematic diagram of a denitrification method according to the present invention.

1—flue gas cooling system, 2—low temperature adsorption denitrification system.

The drawings are used to provide a further understanding of the present invention and constitute a part of the present invention. The illustrative embodiments of the present invention and the descriptions thereof are used to explain the present invention, and are not intended constitute an improper limitation on the present invention.

DETAILED DESCRIPTION OF EMBODIMENTS

In order to clearly explain the present invention, the present invention will be further described in detail with reference to examples and drawings. It is understood by those skilled in the art that the following contents do not limit the protection scope of the present invention, and any improvements and changes made on the basis of the present invention are within the protection scope of the present invention.

A flue gas denitrification method by low-temperature adsorption includes: pressurizing a flue gas that has been subjected to dust removal and desulfurization, precooling the pressurized flue gas, cooling the precooled flue gas to a temperature lower than room temperature by a flue gas cooling system, flowing the flue gas at the temperature lower than room temperature into a low-temperature denitrification system, performing physical adsorption denitrification in the low-temperature denitrification system, precooling the flue gas that has been subjected to dust removal and desulfurization with the denitrificated flue gas, and flowing the heat-absorbed clean flue gas into a chimney to be discharged.

The precooled flue gas is indirectly cooled with a heat exchanger, or cooled by direct spray cooling, or cooled by a combination of indirect cooling with a heat exchanger and direct spray cooling.

The precooled flue gas is subjected to staged cooling, the flue gas is subjected to a first stage cooling by heat exchange or spraying, and the flue gas is subjected to a second stage cooling by absorption refrigeration or compression refrigeration.

Condensate water generated after flue gas cooling is recycled to a reclaimed water treatment system, and the adsorbed $NO_2$ is desorbed and recycled.

The denitrification adsorption tower is filled with activated carbon or molecular sieves to adsorb NOx.

The denitrification adsorption tower is thermally insulated at the same time when physical adsorption denitrification is performed in the denitrification adsorption tower, i.e., the outer wall of the fixed bed adsorption tower adopts a cold box structure, which reduces the heat dissipation loss of low-temperature flue gas and keeps adsorption denitrification of the flue gas at a low temperature.

The temperature of the flue gas obtained after the flue gas is cooled is −30° C.-0° C.

The adsorption denitrification mechanism of the method is as follows:

1. Adsorption removal of $NO_2$ in NOx: $NO_2$ is an easily adsorbed gas, and is directly adsorbed and removed when the flue gas flows through the surfaces of activated carbon, molecular sieves or other porous adsorption materials.

2. Adsorption removal of NO in NOx: NO is a gas that is extremely difficult to adsorb, and cannot be directly adsorbed and removed when the flue gas flows through the surfaces of activated carbon, molecular sieves or other porous adsorption materials; the removal is realized by the following steps:

(1) the temperature of the flue gas is reduced to below room temperature through multistage cooling;

(2) NO and $O_2$ in the flue gas below room temperature are enriched on the surface of a porous adsorption material when flowing through the surface of the porous adsorption material, which greatly increases the concentration of NO and $O_2$, thus rapidly oxidizing NO into $NO_2$;

(3) oxidized $NO_2$ is adsorbed on the surface of the porous material.

Steps (2) and (3) are carried out at the same time, and finally, the low-temperature adsorption and removal of NO is realized; the flue gas temperature reduction in step (1) is a necessary condition to realize enrichment and oxidation of NO and $O_2$, and refractory gases such as NO and $O_2$ can be easily adsorbed and enriched on the adsorbent surface only at a low temperature.

The denitrification method of the present invention is shown in FIG. 1; the denitrification method is realized by two main systems, namely a flue gas cooling system 1 and a low-temperature adsorption denitrification system 2.

The flue gas temperature is reduced to a temperature below room temperature by circulating cooling water and multistage cooling equipment of low-temperature water chillers, and the flue gas condensate water is separated; the flue gas cooling system 1 is provided with cold recovery heat-exchange equipment for low-temperature clean flue gas; in the physical adsorption denitrification process, a fixed bed adsorption tower is adopted, which is filled with activated carbon, molecular sieves or other porous adsorption materials, and the outer wall of the fixed bed adsorption tower adopts a cold box structure to reduce the heat dissipation loss of low-temperature flue gas and maintain the flue gas adsorption denitrification at a low temperature.

The process of the denitrification method of the present invention is described as follows:

The boiler flue gas without denitrification is subjected to dust removal and desulfurization, then heat recovery by an air preheater, and then introduced into a denitrification system by a fan; the flue gas first passes through the flue gas cooling system 1, and is cooled to a temperature below room temperature after multistage cooling, and the condensate water in the flue gas is separated from the flue gas; the flue gas after cooling flows through the low-temperature adsorption denitrification system 2, where NOx ($NO_2$ and NO) is adsorbed and removed by the adsorption layer; the adsorption layer is activated carbon or molecular sieves filled, and the denitrificated low-temperature clean flue gas is discharged into the chimney after cold recovery.

Figure 3:
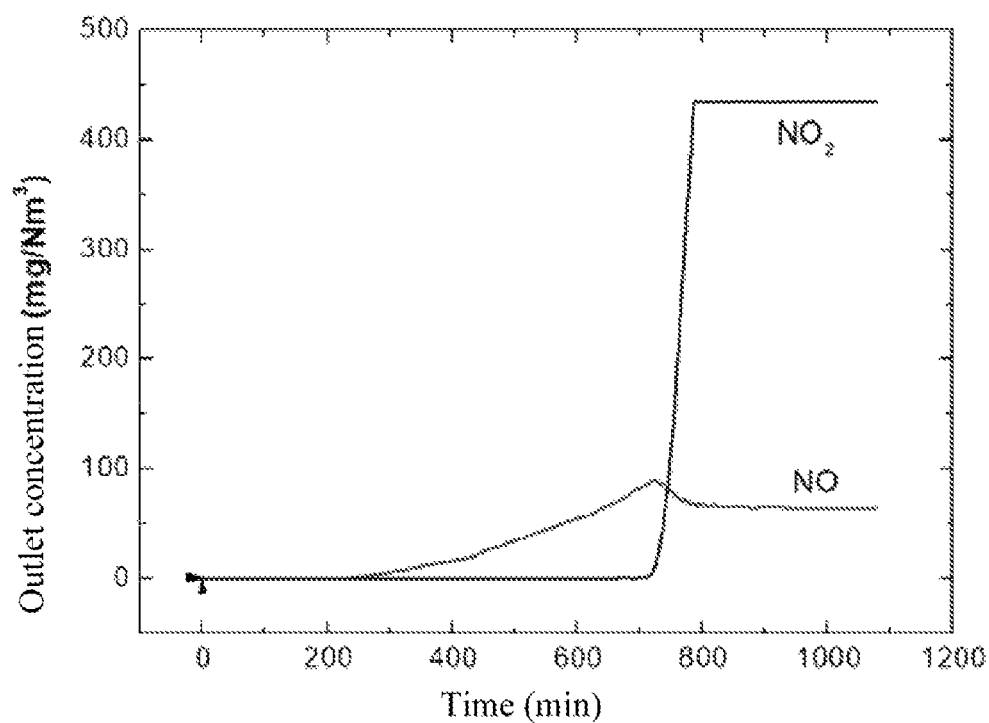
FIG. 3 is a graph of the NOx adsorption effect of activated carbon when the flue gas drops to $0°$ C.

Example 1: the flue gas with a NO content of 500 mg/$Nm^3$ was cooled to 0° C. and flowed through 5 g activated carbon at a flow rate of 1 L/min (space velocity=6000 $h^{-1}$), and the NOx content of the flue gas after passing through the activated carbon bed over time is shown in FIG. 3. The penetration time through the activated carbon bed and the effective NOx adsorption capacity are shown in Table 1.

Figure 4:
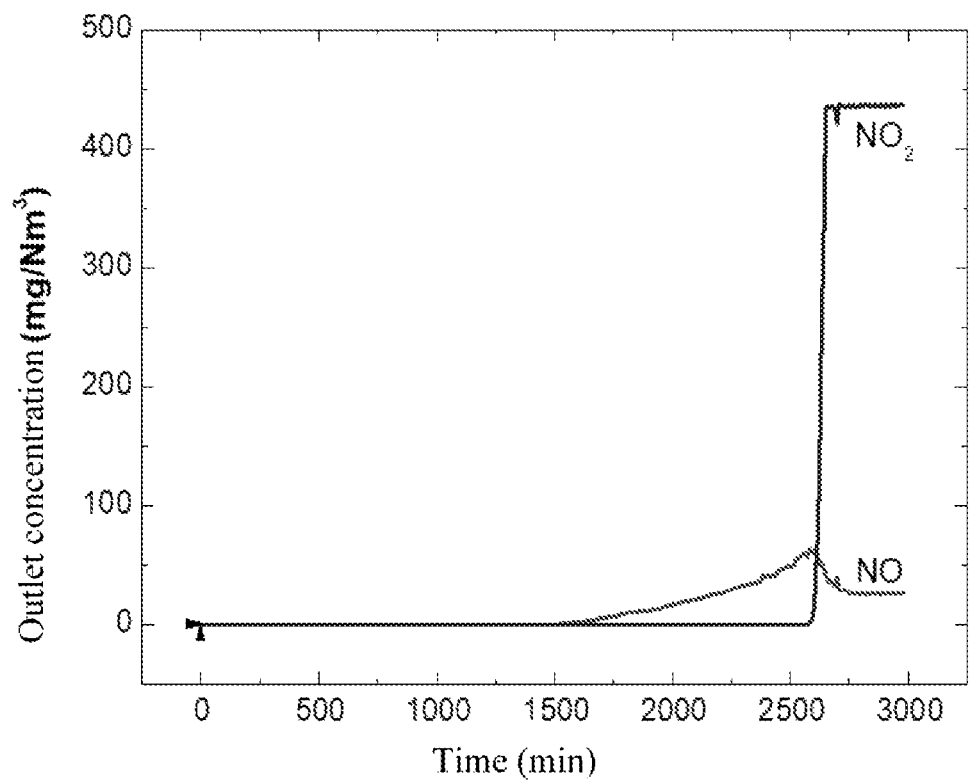
FIG. 4 is a graph of the NOx adsorption effect of activated carbon when the flue gas drops to $-30°$ C.

Example 2: the same method as in example 1 was adopted, except that the flue gas temperature was reduced to −30° C.; and the NOx content of flue gas after passing through activated carbon bed over time is shown in FIG. 4. The penetration time through activated carbon bed and the effective NOx adsorption capacity are shown in Table 1.

Figure 2:
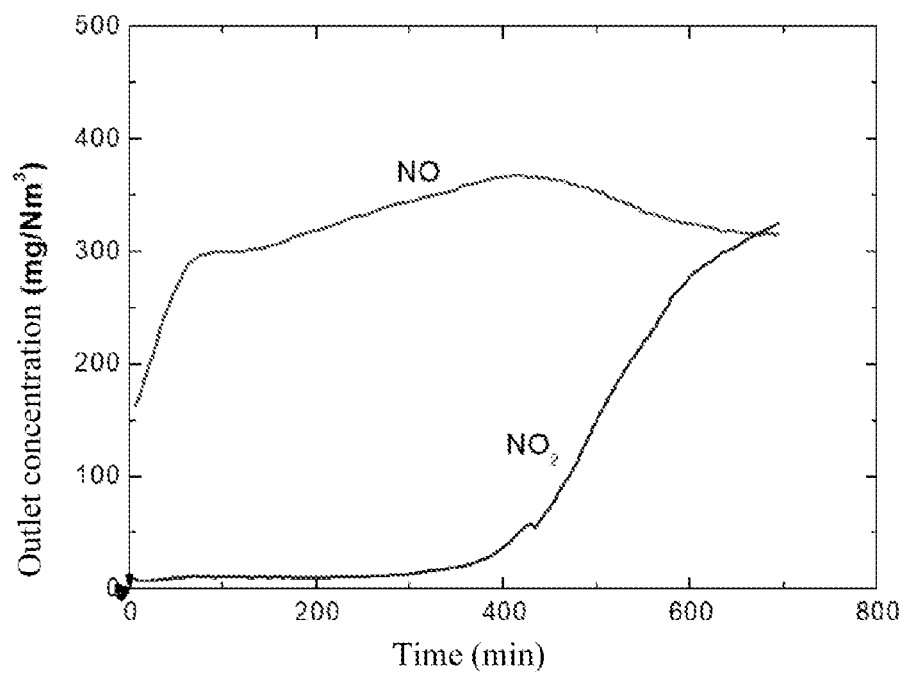
FIG. 2 is a graph of the NOx adsorption effect of activated carbon at room temperature.

Comparative example: the same method as in example 1 was adopted, except that the flue gas temperature was maintained at room temperature; the NOx content of the flue gas after passing through activated carbon bed over time is shown in FIG. 2. The penetration time through the activated carbon bed and the effective NOx adsorption capacity are shown in Table 1.

TABLE 1

Comparison of bed penetration time
and NOx effective adsorption capacity of examples

| Examples | Penetration time (min) | | | Effective NOx adsorption capacity (mg/g) | |
| --- | --- | --- | --- | --- | --- |
| | NOx penetration | NO penetration | $NO_2$ penetration | A0 | A50 |
| Comparative example (room temperature) | 0 | 0 | 240 | 0 | 0 |
| Example 1 (0° C.) | 230 | 230 | 720 | 27.6 | 86.4 |
| Example 2 (−30° C.) | 1500 | 1500 | 2600 | 180 | 312 |

Note:
A0 is the effective adsorption capacity corresponding to zero discharge of NOx at the outlet of the bed;
A50 is the effective adsorption capacity corresponding to ultra-low discharge of NOx at the outlet of the bed.

The analysis results show that NO penetrates prior to $NO_2$ at any temperature, so the penetration time of NOx is consistent with the penetration time of NO; at room temperature (comparative example), NOx penetrates instantaneously, so the effective adsorption capacity of NOx is 0; when the flue gas temperature drops to 0° C. (Example 1) and −30° C. (Example 2), the penetration time and effective adsorption capacity increase rapidly with the decrease of temperature. Therefore, the low-temperature adsorption method of the present invention can effectively adsorb and remove NOx at a low temperature to meet the requirements of zero or ultra-low discharge.

What is claimed is:

1. A flue gas low-temperature adsorption denitration method, comprising: pressurizing a flue gas that has been subjected to dust removal and desulfurization, precooling pressurized flue gas, cooling precooled flue gas to a temperature lower than room temperature by a flue gas cooling system (1), flowing the flue gas at the temperature lower than room temperature into a low-temperature denitrification system (2), performing physical adsorption denitrification in the low-temperature denitrification system (2), precooling the flue gas that has been subjected to dust removal and desulfurization with denitrificated flue gas, and flowing heat-absorbed clean flue gas into a chimney to be discharged.

2. The flue gas low-temperature adsorption denitrification method according to claim 1, wherein the precooled flue gas is indirectly cooled with a heat exchanger, or cooled by direct spray cooling, or cooled by a combination of indirect cooling with a heat exchanger and direct spray cooling.

3. The flue gas low-temperature adsorption denitrification method according to claim 2, wherein the precooled flue gas is subjected to staged cooling, the flue gas is subjected to a first stage cooling by heat exchange or spraying.

4. The flue gas low-temperature adsorption denitrification method according to claim 3, wherein the flue gas is subjected to a second stage cooling by absorption refrigeration or compression refrigeration.

5. The flue gas low-temperature adsorption denitrification method according to claim 1, wherein condensate water generated after flue gas cooling is recovered to a reclaimed water treatment system.

6. The flue gas low-temperature adsorption denitrification method according to claim 1, wherein a denitrification adsorption tower is filled with activated carbon or molecular sieves to adsorb NOx.

7. The flue gas low-temperature adsorption denitrification method according to claim 1, wherein adsorbed $NO_2$ is desorbed and then recycled.

8. The flue gas low-temperature adsorption denitrification method according to claim 1, wherein a denitrification adsorption tower is thermally insulated at the same time when physical adsorption denitrification is performed in the denitrification adsorption tower.

9. The flue gas low-temperature adsorption denitrification method according to claim 1, wherein a temperature of the flue gas obtained after the flue gas is cooled is −30° C.-0° C.

* * * * *